United States Patent
Chang et al.

(10) Patent No.: US 10,243,754 B2
(45) Date of Patent: Mar. 26, 2019

(54) PROTOCOL INDEPENDENT MULTICAST DESIGNATED ROUTER NOTIFY DELAY FEATURE

(71) Applicant: Arista Networks, Inc., Santa Clara, CA (US)

(72) Inventors: Xiaoyan Chang, Santa Clara, CA (US); John French, Santa Clara, CA (US); Prashant Srinivas, Santa Clara, CA (US); Maxim Martynov, Santa Clara, CA (US); Srinivas Subramanian, Santa Clara, CA (US); Yu Iu, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 391 days.

(21) Appl. No.: 14/788,230

(22) Filed: Jun. 30, 2015

(65) Prior Publication Data

US 2017/0005816 A1 Jan. 5, 2017

(51) Int. Cl.
*H04L 12/24* (2006.01)
*H04L 29/08* (2006.01)
(Continued)

(52) U.S. Cl.
CPC ...... *H04L 12/1863* (2013.01); *H04L 41/0654* (2013.01); *H04L 47/10* (2013.01); *H04L 67/1061* (2013.01)

(58) Field of Classification Search
CPC ... H04L 12/18; H04L 12/185; H04L 12/1863; H04L 12/1868; H04L 41/0654;
(Continued)

(56) References Cited

U.S. PATENT DOCUMENTS

| 8,724,456 B1* | 5/2014 | Hong ............... G06F 11/00 370/225 |
| 2009/0161670 A1* | 6/2009 | Shepherd ............ H04L 45/16 370/389 |

(Continued)

OTHER PUBLICATIONS

Cisco Systems, Inc. "Cisco Nexus 9000 Series NX-OS Multicast Routing Configuration Guide, Release 6.x" Americas Headquarters, San Jose, California. Nov. 10, 2014 (118 pages).

*Primary Examiner* — Marsha D Banks Harold
*Assistant Examiner* — Dharmesh J Patel
(74) *Attorney, Agent, or Firm* — Chamberlain, Hrdlicka, White, Williams & Aughtry

(57) ABSTRACT

Method and system for reducing multicast traffic loss including configuring, on a primary DR including a first configured DR priority, a DR parameter including a value and an attribute; sending to a secondary DR, after a PIM interface comes up, a PIM hello message including a default DR priority lower than a second configured priority of the secondary DR; sending to the secondary DR, after the primary DR reaches a system-up state, a PIM hello message including the default DR priority; performing DR functionality, by the primary DR, after reaching the system-up state; and sending to the secondary DR, after waiting a time period corresponding to the value of the DR parameter, a PIM hello message including the first configured DR priority, where the primary DR waits to send the last PIM hello message to the secondary DR after the time period based on the attribute of the DR parameter.

21 Claims, 12 Drawing Sheets

(51) Int. Cl.
*H04L 12/801* (2013.01)
*H04L 12/18* (2006.01)

(58) Field of Classification Search
CPC ......... H04L 45/02; H04L 45/06; H04L 45/16;
H04L 45/22; H04L 45/28; H04L 45/58;
H04L 69/40
See application file for complete search history.

(56) References Cited

U.S. PATENT DOCUMENTS

2009/0296709 A1* 12/2009 Duan ...................... H04L 12/18
370/390
2011/0267962 A1* 11/2011 J S A .................... H04L 41/147
370/242
2016/0261501 A1* 9/2016 Hegde .................... H04L 45/22

* cited by examiner

PROTOCOL INDEPENDENT MULTICAST DESIGNATED ROUTER NOTIFY DELAY FEATURE

BACKGROUND

Network devices in a network are sometimes configured to perform functionality related to the propagation of multicast network traffic between a multicast source device and one or more multicast receiver devices. In such a situation, two or more network devices in the network path between the multicast source device and at least one of the multicast receiver devices may be redundantly configured to potentially act as a part of the network path, with one network device configured to become a part of the network path in the event that another network device ceases being a part of the network path (e.g., during a network device reload).

SUMMARY

In general, in one aspect, the invention relates to a method for reducing multicast traffic loss that includes configuring, on a primary designated router (DR), a DR parameter that includes a value and an attribute, where the primary DR includes a first configured DR priority; sending to a secondary DR that is performing DR functionality, after a Protocol Independent Multicast (PIM) interface of the primary DR comes up, a first PIM hello message that includes a default DR priority that is lower than a second configured priority of the secondary DR; sending to the secondary DR, after the primary DR reaches a system up state, a second PIM hello message that includes the default DR priority; performing DR functionality, by the primary DR, after the primary DR reaches the system up state; and sending to the secondary DR, after waiting a time period corresponding to the value of the DR parameter, a third PIM hello message that includes the first configured DR priority, where the primary DR waits to send the third PIM hello message with the first configured DR priority to the secondary DR after the time period based on the attribute of the DR parameter.

In general, in one aspect, the invention relates to a method for reducing duplicate multicast traffic that includes configuring, on a primary designated router (DR), a DR parameter that includes a value and an attribute, where the primary DR comprises a first configured DR priority; sending to a secondary DR that is performing DR functionality, after a protocol independent multicast (PIM) interface of the primary DR comes up, a first PIM hello message that includes a default DR priority that is lower than a second configured priority of the secondary DR; sending to the secondary DR, after the primary DR reaches a system up state, a second PIM hello message that includes the first configured DR priority, where receipt of the second PIM hello message causes the secondary DR to cease performing DR functionality, where the primary DR sends the second PIM hello message with the first configured DR priority to the secondary DR after reaching the system up state based on the attribute of the DR parameter; and performing DR functionality, by the primary DR, after a time period based on reaching the system up state and the value of the DR parameter.

In general, in one aspect, the invention relates to a network device that includes a processor; a Protocol Independent Multicast (PIM) interface; a first configured designated router (DR) priority that is higher than both a default DR priority and a second configured DR priority of a secondary DR; and a DR parameter that includes a value and an attribute, where that network device is configured as a primary DR, wherein the network device is operatively connected to a rendezvous point (RP) router, a shared-media local area network (LAN), and the secondary DR. In one or more embodiments of the invention, the network device includes functionality to send to the secondary DR that is performing DR functionality, after the PIM interface of the primary DR comes up, a first PIM hello message that includes the default DR priority, which is lower than the second configured priority of the secondary DR; send to the secondary DR, after the primary DR reaches a system up state, a second PIM hello message that includes the default DR priority; perform DR functionality, by the primary DR, after the primary DR reaches the system up state; and send to the secondary DR, after waiting a time period based on the value of the DR parameter, a third PIM hello message that includes the first configured DR priority, wherein the primary DR waits to send the third PIM hello message with the first configured DR priority to the secondary DR after the time period based on the attribute of the DR parameter.

In general, in one aspect, the invention relates to a network device that includes a processor; a Protocol Independent Multicast (PIM) interface; a first configured designated router (DR) priority that is higher than both a default DR priority and a second configured DR priority of a secondary DR; and a DR parameter that includes a value and an attribute, where that network device is configured as a primary DR, and where the network device is operatively connected to a rendezvous point (RP) router, a shared-media local area network (LAN), and the secondary DR. In one or more embodiments of the invention, the network device includes functionality to send to the secondary DR that is performing DR functionality, after the PIM interface of the primary DR comes up, a first PIM hello message that includes a default DR priority that is lower than a second configured priority of the secondary DR; send to the secondary DR, after the primary DR reaches a system up state, a second PIM hello message that includes the first configured DR priority, wherein receipt of the second PIM hello message causes the secondary DR to cease performing DR functionality, and wherein the primary DR sends the second PIM hello message with the first configured DR priority to the secondary DR after reaching the system up state based on the attribute of the DR parameter; and perform DR functionality, by the primary DR, after a time period based on reaching the system up state and the value of the DR parameter.

Other aspects of the invention will be apparent from the following description and the appended claims.

DETAILED DESCRIPTION

Figure 1:
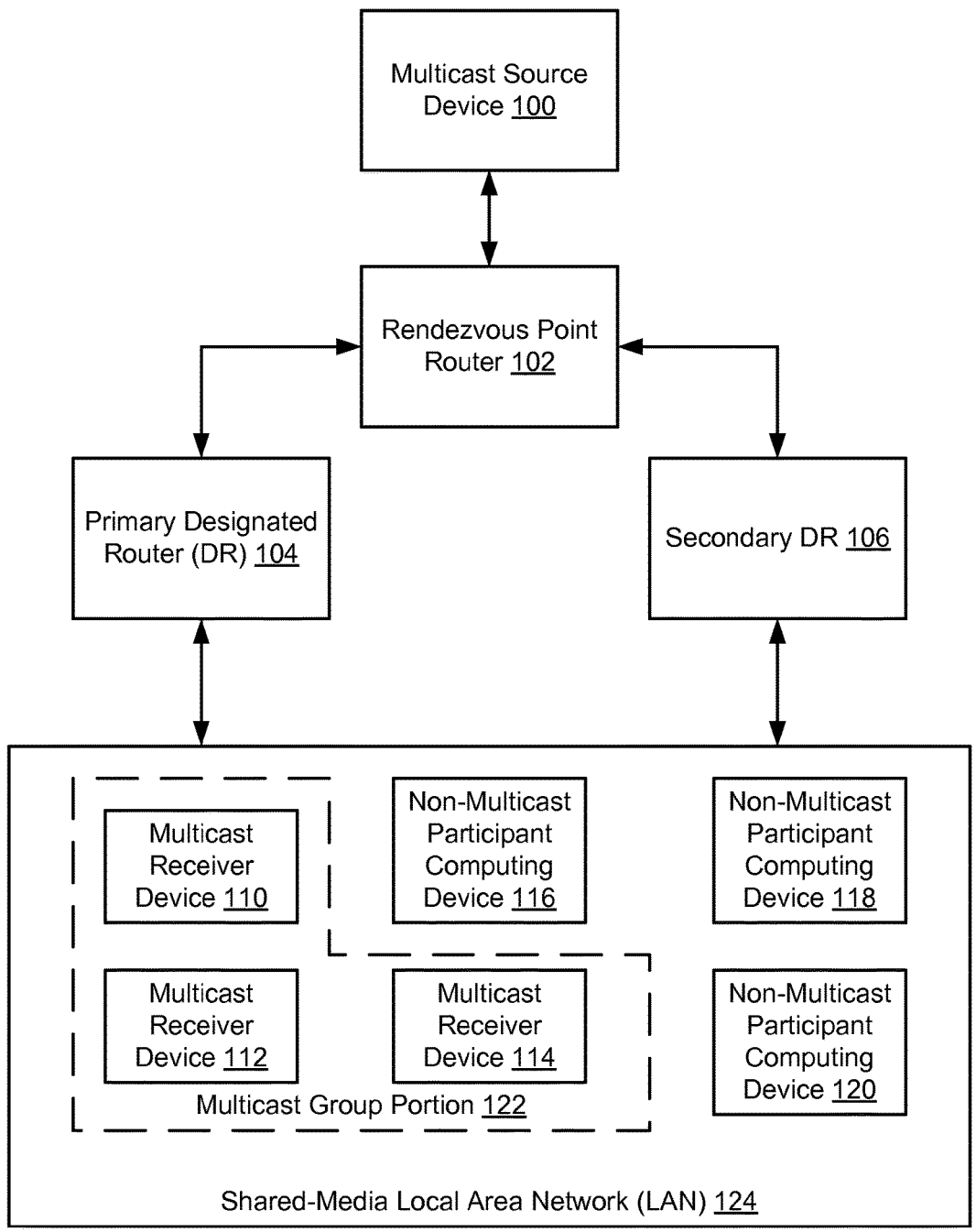
FIG. 1 shows a system in accordance with one or more embodiments of the invention.

Specific embodiments of the invention will now be described in detail with reference to the accompanying figures. Like elements in the various figures may be denoted by like reference numerals and/or like names for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). Additionally, words of degree (e.g., primary, secondary, tertiary, etc.) may be used as an adjective for an element. The use of ordinal numbers and/or words of degree are not to imply or create any particular ordering of the elements nor to limit any element to being only a single element unless expressly disclosed, such as by the use of the terms "before", "after", "single", and other such terminology. Rather, the use of ordinal numbers and/or words of degree are to distinguish between the elements. By way of an example, a first element is distinct from a second element, and the first element may encompass more than one element and succeed (or precede) the second element in an ordering of elements. Also, the use of consecutive numbers (e.g., "first" and "second") does not necessarily imply that there are no intervening elements of the same type. For example, a first message and a second message should not imply that there are no messages before, between, and/or after the first message and the second message.

One or more embodiments of the invention may relate to the Protocol Independent Multicast (PIM)-Sparse Mode (SM) protocol. One version of the PIM-SM protocol is defined as Request for Comments (RFC) 4601 in the document entitled "Protocol Independent Multicast-Sparse Mode (PIM-SM): Protocol Specification (Revised)" dated August, 2006. The PIM-SM protocol is hereby incorporated by reference in its entirety. The invention is not limited to a particular version of PIM-SM.

In general, embodiments of the invention relate to a system and method for a primary designated router (DR) to exercise at least some control over the timing of a secondary DR ceasing to perform DR functionality. Specifically, in one or more embodiments of the invention, a primary DR is configured with a parameter having a value and an attribute. The value may relate to a period of time from an event (e.g., a router reaching a system up state). The attribute may determine the time at which the primary DR sends a message (e.g., a PIM hello message) to the secondary DR to cause the secondary DR to cease performing DR functionality.

FIG. 1 shows a system in accordance with one or more embodiments of the invention. As shown in FIG. 1, the system includes a multicast source device (100), a rendezvous point (RP) router (102), a primary designated router (DR) (104), and a secondary DR (106). The system shown in FIG. 1 also includes a shared-media local area network (LAN) (124) that includes one or more multicast receiver devices (110, 112, 114) along with any number of other non-multicast participant computing devices (116, 118, 120). One or more of the multicast receiver devices (110, 112, 114) may be included in a multicast group portion (122). Each of these components is described below.

In one or more embodiments of the invention, a multicast source device (100) is any device that includes functionality to transmit data towards multiple receivers, which may be referred to as a multicast group (e.g., multicast group portion (122)). In one or more embodiments of the invention, a multicast source device may not necessarily be aware of the devices of a multicast group to which the multicast source device transmits data, but may instead be configured to transmit a single copy of the data to a single alias representing the multicast group (e.g., a multicast Internet Protocol (IP) address defined for the group). A multicast group may have zero or more members at any given time. As used herein, the term multicast refers to the transmission of data from a single source to multiple recipients via a network. The multicast source device (100) may be a computing device. In one or more embodiments of the invention, a computing device is any device and/or any set of devices capable of electronically processing instructions and that includes at least the minimum processing power, memory, input and output device(s), and/or network connectivity in order to contribute to the performance of at least some portion of the functions described in accordance with one or more embodiments of the invention. Examples of computing devices include, but are not limited to, a server machine (e.g., a blade-server in a blade-server chassis), a virtual machine (VM), a desktop computer, a mobile device (e.g., laptop computer, smartphone, personal digital assistant, tablet computer, and/or any other mobile computing device), a distributed computing system, and/or any other type of computing device with the aforementioned minimum requirements.

Multicast data transmitted by a multicast source device (100) may originate from one or more applications (not shown) executing on the multicast source device (100). As an example, a multicast source device (100) may be a device for transmitting multicast video data to members of a multicast group so that the video data may be viewed (e.g., via a display device) by a user of each multicast receiver device in a multicast group. A single copy of multicast data may be transmitted from a multicast source device (100), with replication of the data for the multicast receivers occurring via one or more network devices along the network path between the multicast source device (100) and the various receivers of the multicast group.

In one or more embodiments of the invention, a multicast receiver device (110, 112, 114) is any device that includes functionality to be a member of a multicast group, and, as such, to receive data from a multicast source device (100). In one or more embodiments of the invention, a multicast receiver device is a computing device (described above). In one or more embodiments of the invention, a multicast receiver device is a network device. A multicast receiver device (110, 112, 114) may include functionality to join and leave a multicast group via join messages and leave messages, respectively. As an example, join and/or leave messages may be Internet Group Management Protocol (IGMP) messages.

In one or more embodiments of the invention, a multicast group portion (122) is at least a portion of a multicast group that is within a shared-media LAN (124). Additional multicast group members may exist outside the shared-media LAN. In one or more embodiments of the invention, there may be any number of multicast receiver devices (110, 112, 114) in a shared-media LAN (124). Multicast receiver devices of a shared-media LAN may be members of any number of multicast groups, and there may be any number of multicast group portions in a shared-media LAN.

In one or more embodiments of the invention, a shared-media LAN (124) is any network of devices (e.g., multicast receiver device (110), computing device (120)) that are capable of communicating with one another, at least in part, via shared media such as, for example, a network switch (not shown). Examples of shared-media LANs include, but are not limited to, Ethernet networks and token ring networks. In one or more embodiments of the invention, a non-multicast participant computing device (116, 118, 120) is substantially similar to the computing device discussed above in the description of the multicast source device (100), except that a non-multicast participant computing device is not configured to participate in a multicast group.

Multicast network traffic may be propagated by one or more operatively connected network devices (e.g., RP router (102), primary DR (104), secondary DR (106)) in a network (not shown) between a multicast source device (100) and one or more devices of a multicast group portion (122) of a shared-media LAN (124). In one or more embodiments of the invention, a network is a collection of one or more network devices that facilitate network connectivity for one or more operatively connected computing devices. In one or more embodiments of the invention, the network may be all or a portion of a computer network. A computer network may include a datacenter network, a wide area network, a local area network, a wireless network, a cellular phone network, and/or any other suitable network that facilitates the exchange of information from one part of the network to another. The network may be coupled with or overlap with the Internet.

One scheme for propagating multicast network traffic in a network is defined, at least in part, by RFC 4601, the PIM-SM Protocol Specification. PIM-SM is a multicast protocol that can use routing information obtained via various other unicast and/or multicast routing protocols in order to build unidirectional shared trees that are rooted at a Rendezvous Point (RP) (e.g., RP router (102)), and which branch out towards one or more multicast receiver devices. In one or more embodiments of the invention, PIM-SM is enabled on a router, thereby enabling the router to participate in the propagation of multicast traffic using the PIM-SM protocol. PIM-SM may be enabled for individual interfaces of a router. A router with at least one PIM interface may be referred to as a PIM enabled router.

In one or more embodiments of the invention, the RP of a shared tree is an RP router (102) on which PIM-SM is enabled. As used herein, a router refers to any network device capable of performing at least some network routing functions (i.e., determining a path in a network by which to propagate data). For example, a router may include functionality to use Internet Protocol (IP) addresses in received packets along with a routing table to determine a route towards the destination of the packet. A routing table may be any collection of information related to one or more routes in a network.

A router may be a physical device that includes persistent storage, memory (e.g., Random Access Memory), one or more processors, and two or more physical ports (i.e., interfaces). Each port may or may not be connected to another device on a network (e.g., a laptop, a server, a switch, a router, etc.). A router may be implemented as a standalone device for performing routing functions. Additionally or alternatively, a router may be implemented as a portion of the functionality of a device configured to perform at least some other functionality. For example, a router may be part of a multi-layer switch configured to perform, in addition to routing functions, other network related functionality, such as using media access control (MAC) address information along with a forwarding table to determine an interface out of which to transmit a MAC frame, applying network policies, etc.

In one or more embodiments of the invention, the RP router (102) is a router that is configured to be the root of one or more non-source specific distribution trees (not shown) for one or more corresponding multicast groups. In one or more embodiments of the invention, devices may join a multicast group by transmitting join messages to the RP router (102) (i.e., join messages are transmitted upstream to the RP router). In one or more embodiments of the invention, data from one or more source devices (e.g., multicast source device (100)) is transmitted from the RP router (102) towards the members of the one or more multicast groups (i.e., data from a multicast source device is transmitted downstream from the RP router after being received from a multicast source device). In one or more embodiments of the invention, in order to transmit multicast data to members of a multicast group, a multicast source device (100) first transmits the multicast data towards an RP router (102) corresponding to the multicast group to which the multicast data is to be sent. The RP router (102) may, in turn, propagate the multicast data along the distribution tree towards the multicast receiver devices of the multicast group. One having ordinary skill in the art and the benefit of this disclosure will appreciate that, in one or more embodiments of the invention, the multicast source device may have no awareness of the RP router, instead being configured to send certain multicast traffic to a certain IP address.

In one or more embodiments of the invention, the RP router (102) is operatively connected to one or more other PIM enabled routers (e.g., primary DR (104, secondary DR (106)). As described above, a PIM enabled router may be any router configured to perform at least some PIM-SM functionality. Two or more of the operatively connected PIM enabled routers may, in turn, be connected to the same shared-media LAN (124) that includes at least one multicast receiver device (e.g., multicast receiver device (112)). In embodiments of the invention such as the embodiment shown in FIG. 1, PIM enabled routers operatively connected to the same shared-media LAN (124) include a primary DR (104) and a secondary DR (106). In one or more embodiments of the invention, the primary DR and the secondary DR are, similar to the above-described RP router (102), configured to perform routing functions, and are also configured to perform PIM-SM related functionality.

Additionally, the primary DR (104) and the secondary DR (106) may each be configured with a DR priority. In one or more embodiments of the invention, a DR priority is an automatically or manually configured setting of a PIM-enabled router that defines an order within a set of routers operatively connected to the same downstream shared-media LAN (124). The order defined by the DR priority may be an order of preference regarding whether a given router is to perform DR functionality for at least a portion of the multicast receiver devices of the shared-media LAN (124).

Generally, a single router operatively connected to a shared-media LAN (124) performs DR functionality on behalf of at least some of the other routers and multicast receiver devices included in and/or operatively connected to the shared-media LAN. DR functionality may include, for example, propagating data from a multicast source device, via an RP router, towards one or more multicast receivers. Election of a single DR may, for example, be part of the process of creating an RP tree for a given multicast group, and may, therefore, reduce the amount of duplicate multicast traffic being propagated toward a given multicast receiver device. As used herein, the term designated router (DR) should be understood, in at least some embodiments of the invention, to include the functionality of a forwarder, which is any PIM enabled router that includes functionality to forward multicast traffic towards a multicast receiver device.

In one or more embodiments of the invention, a primary DR (104) is a router that is chosen via any DR election process to perform DR functionality on behalf of multicast receiver devices of a shared media LAN. For example, a primary DR may be a router configured with the highest DR priority among a set of PIM enabled routers operatively connected to the same shared media LAN (124). As another example, among a set of PIM-enabled routers operatively connected to a shared media LAN, a DR election process may determine that at least two of the routers are configured with the same DR priority. In such a case, the DR election process may choose from among the routers with the same DR priority based on some other information (e.g., an IP address of the router). One of ordinary skill in the art, having the benefit of this disclosure will understand that, in certain scenarios, a given shared media LAN may have more than one router acting as a primary DR at a given time.

In one or more embodiments of the invention, a secondary DR (106) is any router operatively connected to the same shared-media LAN as the primary DR (104) and which is configured, automatically or manually, with a DR priority lower that the DR priority configured for the primary DR. DR election may be performed, at least in part, via the sending of PIM hello messages between routers in a set of routers operatively connected to the same shared media LAN (124). A PIM hello message may include, but is not limited to, the DR priority configured for the router sending the PIM hello message, which serves to make neighbor PIM enabled routers aware of the DR priority of the sending router so that the receiving router may take appropriate action (e.g., continue or cease performing DR functionality).

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted.

As an additional example, there may be any number of PIM enabled routers connected to a shared-media LAN and therefore any number of possible devices capable of acting as a DR, and, if one DR is the primary DR, any number of possible secondary DRs. Furthermore, although not shown in FIG. 1, there may be any number of multicast receiver devices, any number of multicast groups, and any number of multicast source devices. Also, there may be any number of network devices (e.g., routers, switches, etc.) in any network topography forming a network that connects one or more multicast source devices to one or more multicast receiver devices, provided that at least one network device is configured as an RP router, and that the RP router is operatively connected to at least two possible DRs. Lastly, the shared-media LAN may operatively connect multiple routers, and one or more multicast receiver devices may be operatively connected to one of the routers, but may not be a part of the shared media LAN operatively connecting the multiple routers. In such a case, a DR election may still be made to determine which router will perform DR functionality for multicast traffic reaching the shared-media LAN on the way to the one or more multicast receiver devices. Accordingly, for at least the above-recited reasons, embodiments of the invention should not be considered limited to the specific arrangements of devices and elements shown in FIG. 1.

Figure 2:
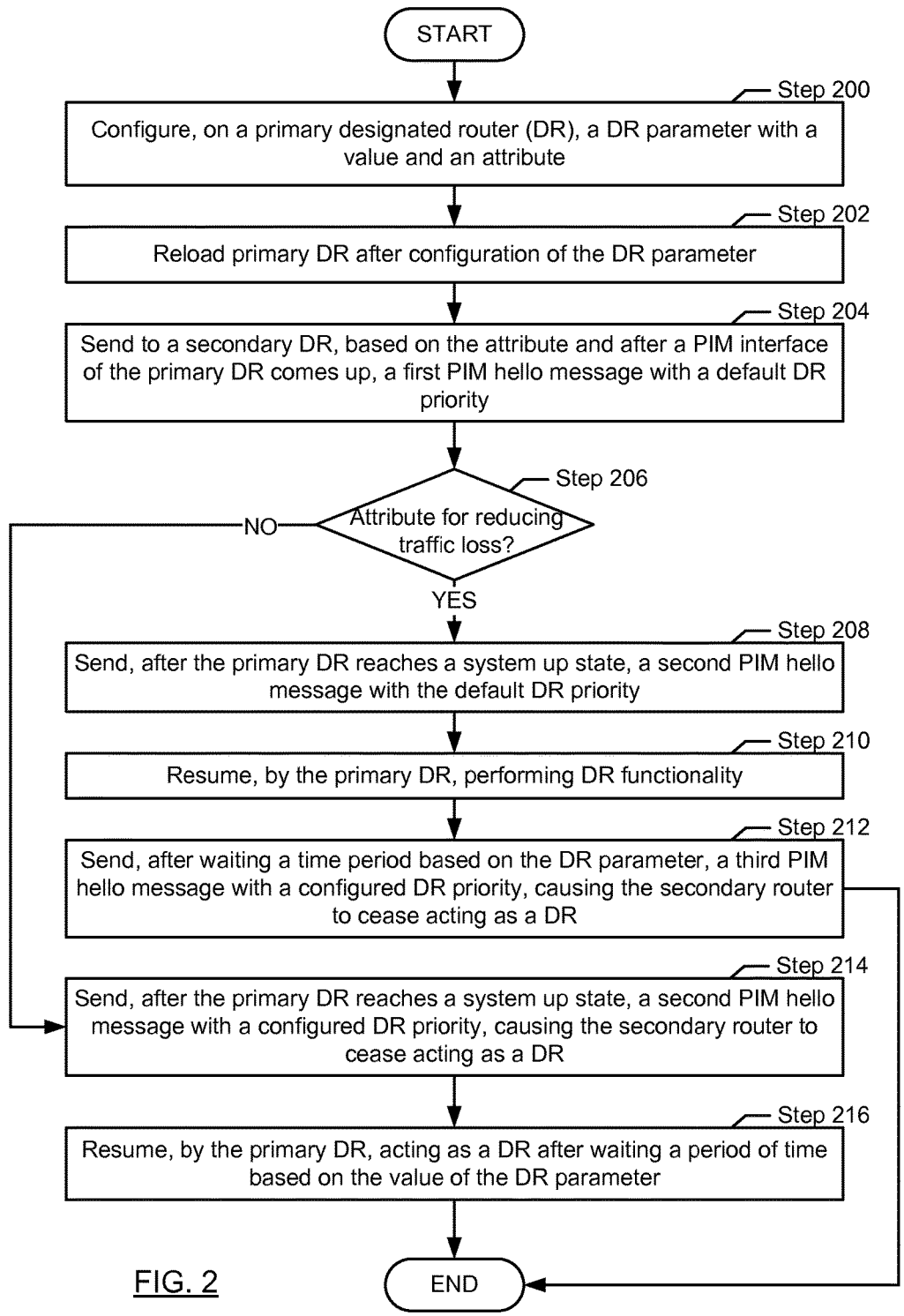
FIG. 2 shows a flowchart in accordance with one or more embodiments of the invention.

FIG. 2 shows a flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

FIG. 2 shows a flowchart describing a method for controlling when a primary DR informs a secondary DR of the configured DR priority of the primary DR, and when a primary DR resumes performing DR functionality. In one or more embodiments of the invention, the method shown in FIG. 2 assumes that a network of operatively connected PIM enabled routers are configured to propagate multicast traffic from a multicast source device towards one or more multicast receiver devices. Additionally, FIG. 2 assumes that at least one of the PIM enabled routers is configured as a RP router for a shared tree connecting the multicast source device to at least one multicast receiver device of a multicast group associated with the shared tree of which the RP router is the root. Also, FIG. 2 assumes that there are at least two PIM enabled routers operatively connected to the same shared-media LAN to which at least one multicast receiver device is also operatively connected (e.g., either directly or via a router). Furthermore, FIG. 2 assumes that the two PIM enabled routers are configured with different DR priorities, with the higher DR priority designating a primary DR, the lower DR priority designating a secondary DR, and with both the DR priorities being higher than a default DR priority. One of ordinary skill in the art, having the benefit of this disclosure will understand that although FIG. 2 is described with the assumption that the primary DR has a configured DR priority that is higher than the configured DR priority of the secondary DR, embodiments of the invention are applicable for any scenario where at least two possible DRs are connected to a shared media LAN and one can be chosen to act as DR via a DR election process. For example, if the DR priorities are the same for two routers, a router with a higher IP address may be determined to be the primary DR.

In Step 200, a DR parameter is configured on a router. In one or more embodiments of the invention, the configured DR parameter has a value and an attribute. In one or more embodiments of the invention, the value represents a time delay (e.g., in seconds) that defines a length of time from a given event that a primary router takes before transmitting a PIM hello message that includes a configured DR priority rather than a default DR priority, or the length of time from a given event that the primary DR waits before resuming performance of DR functionality. The event may be, for example, a system up state (discussed further below) being reached by the primary DR. In one or more embodiments of the invention, the attribute may be any characteristic of the parameter capable of conveying information to the primary DR. For example, the attribute may be a sign of the value (e.g., positive or negative), which informs the primary DR to take one action, or set of actions, if the value is positive and a different action, or set of actions, if the value is negative.

In Step 202, after the DR parameter is configured for the primary DR, the primary DR is reloaded. In one or more embodiments of the invention, the term reload, as used herein, refers to any action that causes the primary DR to cease performing DR functionality for any period of time. For example, a reload of the primary DR may be, but is not limited to, a reset via a command line instruction, a reboot, a power-cycle, being brought offline for maintenance, being subjected to a lost network connection, and/or experiencing hardware and/or software issues, problems, and/or failures. As used herein, reload may also refer to the configuration of a router as a primary DR and at least one interface of the router as a PIM interface.

In one or more embodiments of the invention, in response to the reload of the primary DR, a secondary DR begins performing DR functionality for one or more multicast receiver devices of the operatively connected shared-media LAN. The secondary DR may take over the DR role, for example, after no PIM hello messages are received from the primary DR for a configured PIM hello timeout period. The secondary DR may be selected via a DR election process using any means of determining a router to act as a DR. For example, the secondary DR may assume the DR role by virtue of having, of the routers operatively connected to the shared-media LAN, the second highest DR priority after the configured DR priority of the primary DR. As another example, the secondary DR may be selected via a round-robin scheme implemented among routers with the same configured DR priority attached to the same shared-media LAN. As a third example, in the event that two or more routers have the same DR priority, the secondary DR may be the router with the highest primary IP address.

In Step 204, after the primary DR reload of Step 202, a PIM enabled interface of the primary router comes up, and a first PIM hello message is transmitted from the primary DR to the secondary DR. In one or more embodiments of the invention, a PIM enabled interface may be referred to as up any time after the interface becomes activated (e.g., becomes capable of transmitting data). For example, after a reboot of the primary DR, a PIM enabled interface may be among the various components and subsystems of the primary DR that are initialized, and once a PIM enabled interface is initialized, it may be referred to as up. In one or more embodiments of the invention, the first PIM hello message includes a default DR priority. In one or more embodiments of the invention, the default DR priority is a lower DR priority than either the configured DR priority of the primary DR or the DR priority of the secondary DR. Accordingly, the secondary DR may respond to the receipt of the first PIM hello message by continuing to perform DR functionality, because the DR priority in the first PIM hello message (i.e., the default DR priority) is lower than the DR priority of the secondary DR.

In Step 206, a determination is made as to whether the attribute of the DR parameter indicates that traffic loss should be reduced, even if the possibility of duplicate traffic being sent towards one or more multicast receiver devices exists. In one or more embodiments of the invention, actions, or sets of actions, that a primary DR may take based on the attribute include, but are not limited to: (i) waiting an amount of time, based on the value of the DR parameter, after the occurrence of an event and then sending a PIM hello message with a configured DR priority rather than a default DR priority, which may reduce traffic loss during a DR transition by allowing for duplicate multicast traffic through two DRs for some time period; and (ii) sending a PIM hello message with a configured DR priority rather than a default DR priority when an event occurs, rather than an DR parameter value-based time period later, such that duplicate multicast traffic is avoided at the cost of possible multicast traffic loss. For example, if the attribute is that the value is positive, the primary DR may perform action (i), and if the attribute is that the value is negative, the primary DR may perform action (ii). If the attribute indicates the primary DR should perform action (i) (i.e., reducing traffic loss), then the process proceeds to Step 208. Otherwise, the process proceeds to Step 214.

In Step 208, after the primary DR reaches a system up state, a second PIM hello message is sent by the primary DR to the secondary DR. One of ordinary skill in the art, having the benefit of this disclosure, will understand that although "first", "second", etc. are used when describing PIM hello messages there may, in fact, be any number of PIM hello messages sent by a router before, between, and/or after any PIM hello messages so labeled. In one or more embodiments of the invention, the second PIM hello message, based on the attribute of the DR parameter indicating that multicast traffic loss should be reduced, remains the default DR priority. A system up state may be any state of the primary DR that is reached after a PIM interface comes up, but before the primary DR is fully ready to perform DR functionality. For example, a system up state may be the point at which the various relevant components and/or subsystems of the primary DR have all been initialized and/or activated, but before the routing tables and/or shared tree information necessary to perform PIM-SM related functionality have been obtained by the primary DR.

In Step 210, after reaching the system up state, the primary DR resumes performing DR functionality. Resumption of performing DR functionality may include acquiring relevant information from other devices, such as route information, using any type of information acquisition protocol (e.g., a unicast routing protocol). Resumption of performing DR functionality may also include processing PIM join and/or leave messages from multicast receiver devices, and propagating multicast traffic towards multicast receiver devices. In one or more embodiments of the invention, after the primary DR resumes performing DR functionality, there are two DR for the shared-media LAN (i.e., the primary DR and the secondary DR), which may result in duplicate multicast traffic being transmitted towards one or more of the multicast receiver devices. However, the existence of two routers performing DR functionality while the primary DR is still obtaining information may reduce amount of lost multicast traffic that is destined for a given multicast receiver device.

In Step 212, after waiting a period of time based on the value of the DR parameter, the primary DR sends a third PIM hello message to the secondary DR. In one or more embodiments of the invention, the third PIM hello message includes the configured DR priority of the primary DR. In one or more embodiments of the invention, the configured DR priority of the primary DR is, as described above, higher than the DR priority of the secondary DR. In one or more embodiments of the invention, in response to the receipt of a PIM hello message with the configured DR priority of the primary DR, the secondary DR ceases acting as the DR for the operatively connected shared-media LAN.

In one or more embodiments of the invention, ceasing to act as a DR includes stopping, at least, transmission of multicast traffic to the multicast receiver devices of the shared-media LAN. One having ordinary skill in the art, as well as the benefit of this disclosure, will understand that although a router may be described as ceasing to act as a DR, the router may still perform functionality other than multicast traffic propagation that is related to PIM. For example, the router may still send and receive PIM hello messages, or propagate PIM join and/or leave messages, etc. In one or more embodiments of the invention, the value of the DR parameter is related to the amount of time a given primary DR is expected to take to, after reaching a system up state, reach a state of being fully able to perform DR functionality. In one or more embodiments of the invention, the process ends after Step 212 is performed.

Turning to Step 214, after sending the first PIM hello message in Step 204, and once a determination is made in Step 206 that the attribute of the DR parameter does not indicate that multicast traffic loss should be reduced, the primary DR sends a second PIM hello message to the secondary DR upon reaching a system up state (described above). In one or more embodiments of the invention, the second PIM hello message includes the configured DR priority of the primary DR. In one or more embodiments of the invention, after receipt of the second PIM hello message with the configured DR priority of the primary DR, the secondary DR stops performing DR functionality (i.e., stops propagating multicast network traffic towards multicast receivers of the shared-media LAN). One of ordinary skill in the art, having the benefit of this disclosure, will understand that the secondary DR stopping performance of DR functionality may not be an immediate action, but may occur over a period of time of any length. For example, multicast traffic that has already been received by the secondary DR when the second PIM hello message arrives may still be propagated towards one or more multicast receivers In one or more embodiments of the invention, at this point, neither the primary DR nor the secondary DR are performing DR functionality. Accordingly, multicast traffic destined for one or more multicast receiver devices may be lost until the primary DR resumes performing DR functionality, which may occur at a later time based on the value of the DR parameter. However, the lack of any router(s) acting as a DR may reduce or avoid duplicate multicast traffic transmitted to a given multicast receiver device.

In Step 216, after waiting a period of time based on the value of the DR parameter, the primary DR resumes performing DR functionality. In one or more embodiments of the invention, once the primary DR resumes performing DR functionality, PIM-SM related traffic (e.g., PIM joins, multicast traffic for multicast receiver devices, etc.) begins being transmitted via the primary DR.

FIG. 3A, FIG. 3B, FIG. 3C, FIG. 3D, and FIG. 3E show an example in accordance with one or more embodiments of the invention. The following example is for explanatory purposes only and not intended to limit the scope of the invention.

Figure 3A:
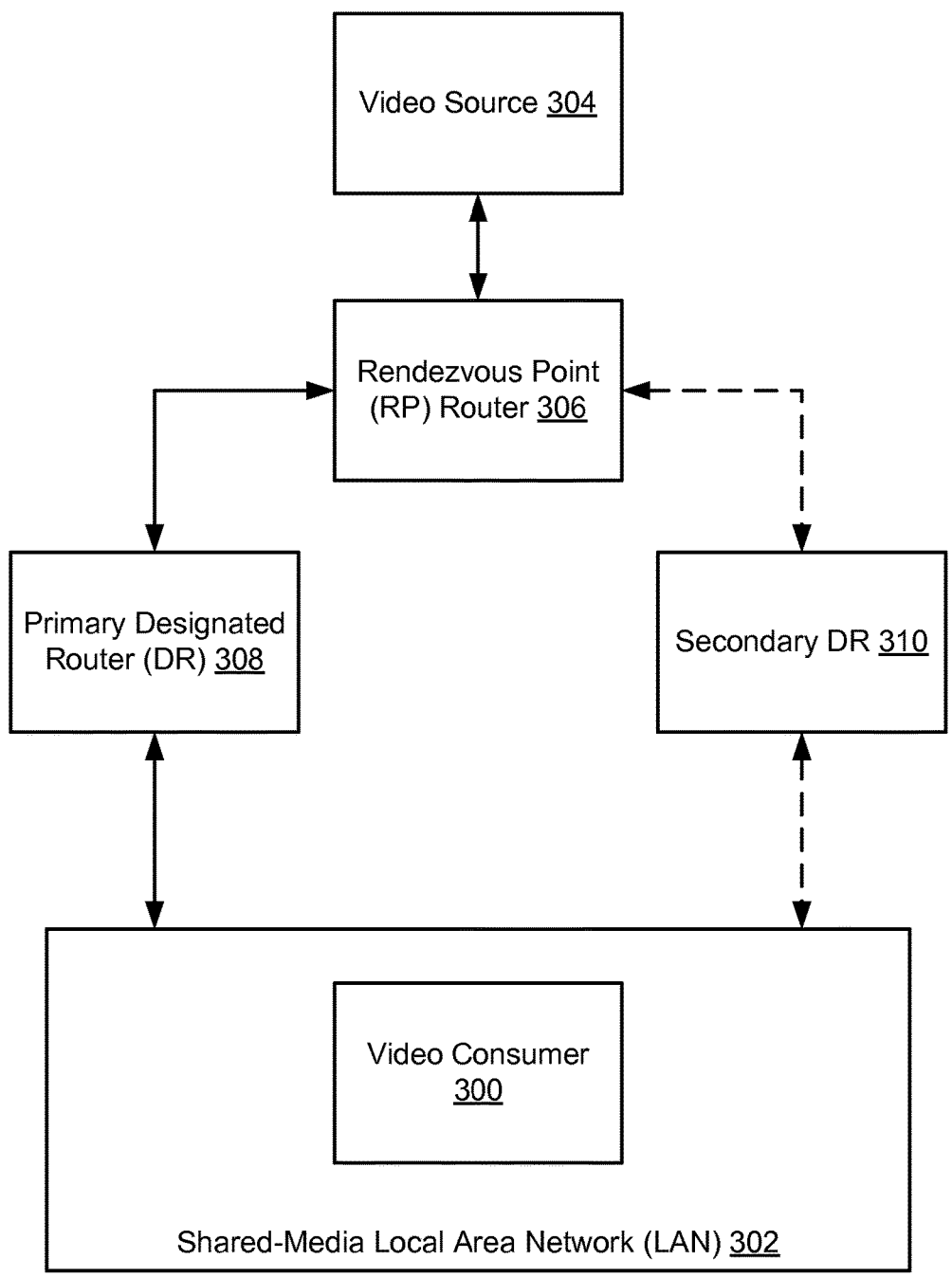
FIG. 3A, FIG. 3B, FIG. 3C, FIG. 3D, and FIG. 3E show an example in accordance with one or more embodiments of the invention.

Referring to FIG. 3A, consider a scenario in which a video consumer (300) computing device is operatively connected to a shared-media LAN (302). The video consumer is a member of a multicast group (not shown). Also connected to the shared-media LAN are two routers, a primary DR (308) and a secondary DR (310), each of which are also operatively connected to a RP router (306). The RP router is operatively connected to a video source (304) computing device that is configured to send multicast video data to the multicast group of which the video consumer is a member.

In such a scenario, the primary DR (308) is configured with a DR priority of 7, while the secondary DR (310) is configured with a DR priority of 6. The default DR priority is one. The dashed line between the shared-media LAN (302) and the secondary DR (310), and the dashed line between the secondary DR (310) and the RP router (306), indicate that although the devices are operatively connected, the path between the RP router and the shared-media LAN that goes through the secondary DR is not a path through which multicast traffic is propagated towards the video consumer (300).

Initially, as shown in FIG. 3A, when the video source sends multicast video data to a multicast group (not shown) of which the video consumer (300) is a member, the video data will be transmitted first to the RP router (306). Next, the RP router will transmit the data downstream via the shared tree of which the RP router is the root. At each branching point (not shown) of the shared tree, a PIM enabled router will duplicate the video data so that a copy can be sent towards multiple multicast group members. Eventually, the video data reaches a point where the video data could be transmitted towards the video consumer via either the primary DR (308) or the secondary DR (310). Because the primary DR has a higher configured DR priority than the secondary DR, it is the primary DR that will propagate the video data towards the video consumer.

Figure 3B:
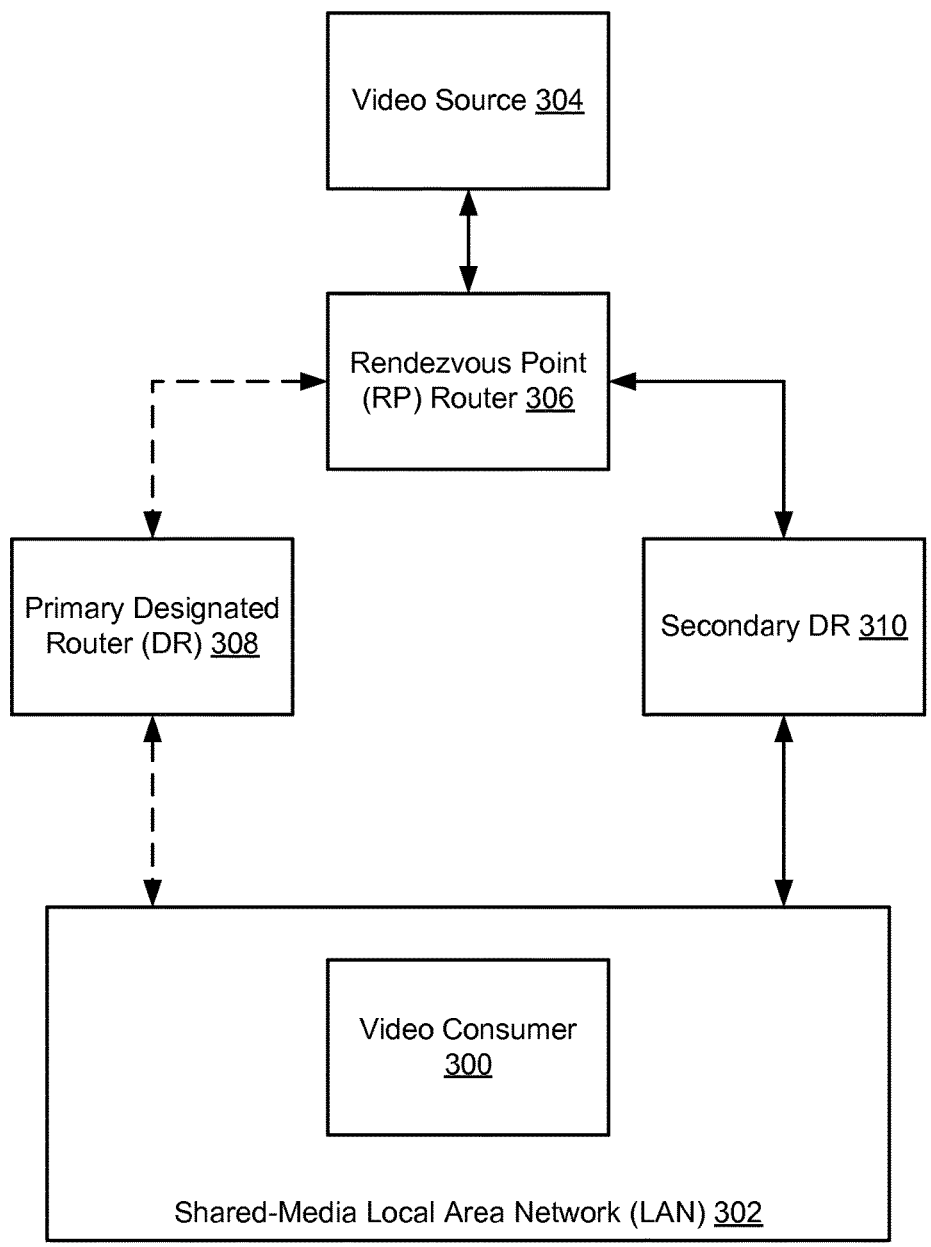

Next, as shown in FIG. 3B, the primary DR (308) ceases performing DR functionality because the primary DR is reloaded. The reload causes the secondary DR (310) to begin acting as the DR operatively connected to the shared-media LAN (302) because the primary DR, during the reload, fails to send a PIM hello message to the secondary DR within a timeout period.

Figure 3C:
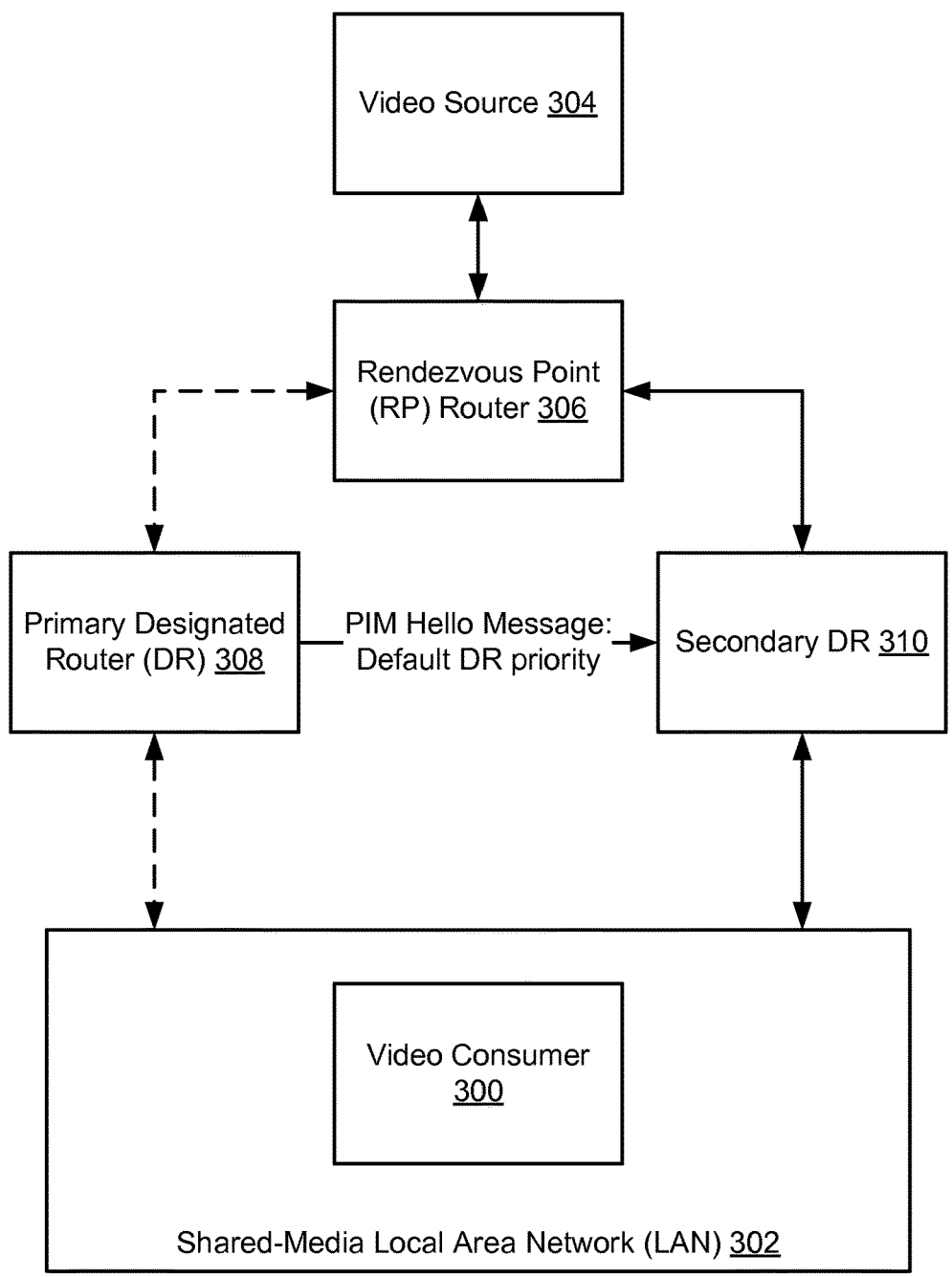

Next, as shown in FIG. 3C, the primary DR (308) begins to come back up after the reload. At this point, the primary DR is not yet performing DR functionality. Once a PIM enabled interface of the primary DR comes up, the primary DR sends a first PIM hello message to the secondary DR that includes a default DR priority, which is lower than the DR priority of the secondary DR (310), rather than the configured DR of the primary DR, which is higher than the DR priority of the secondary DR. Upon receipt of the first PIM hello message, the secondary DR checks the DR priority in the first PIM hello message and determines that the DR priority (i.e., the default DR priority) is lower than the configured DR priority of the secondary DR. Accordingly, the secondary DR takes no action and continues performing DR functionality.

Figure 3D:
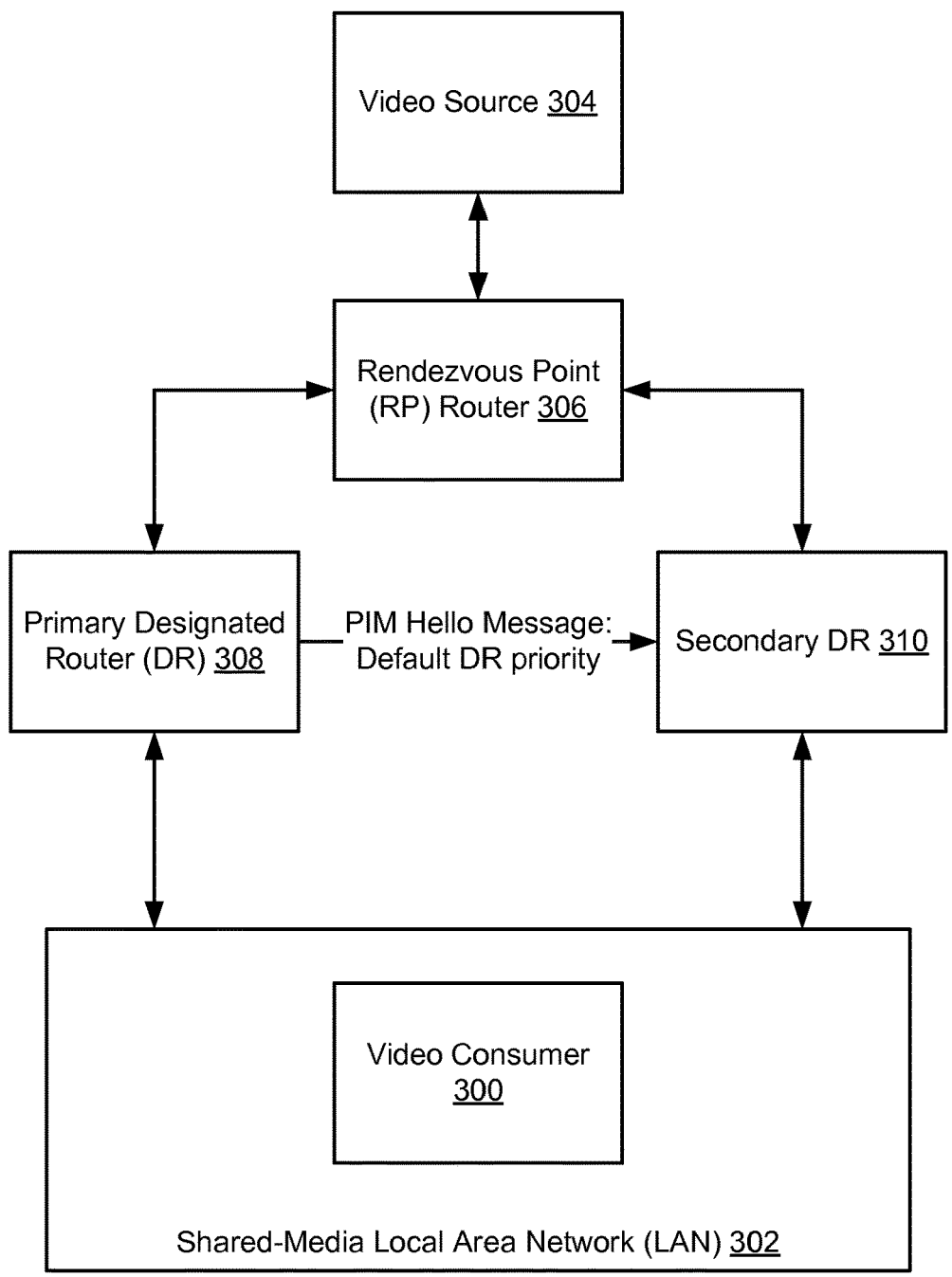

Next, as shown in FIG. 3D, the primary DR (308) reaches a system up state and sends a second PIM hello message to the secondary DR (310), again with the default DR priority, causing the secondary DR to continue performing DR functionality. However, also after reaching the system up state, the primary DR resumes performing DR functionality, even though the primary DR may not be fully ready to do so (e.g., the routing tables of the primary DR have not been fully obtained yet). At this point, both the primary DR and the secondary DR are performing DR functionality, which may lead to duplicate video data from the video source (304) being transmitted towards the video consumer (300) via the shared-media LAN (302). However, the chance that any video data will be dropped is reduced.

Figure 3E:
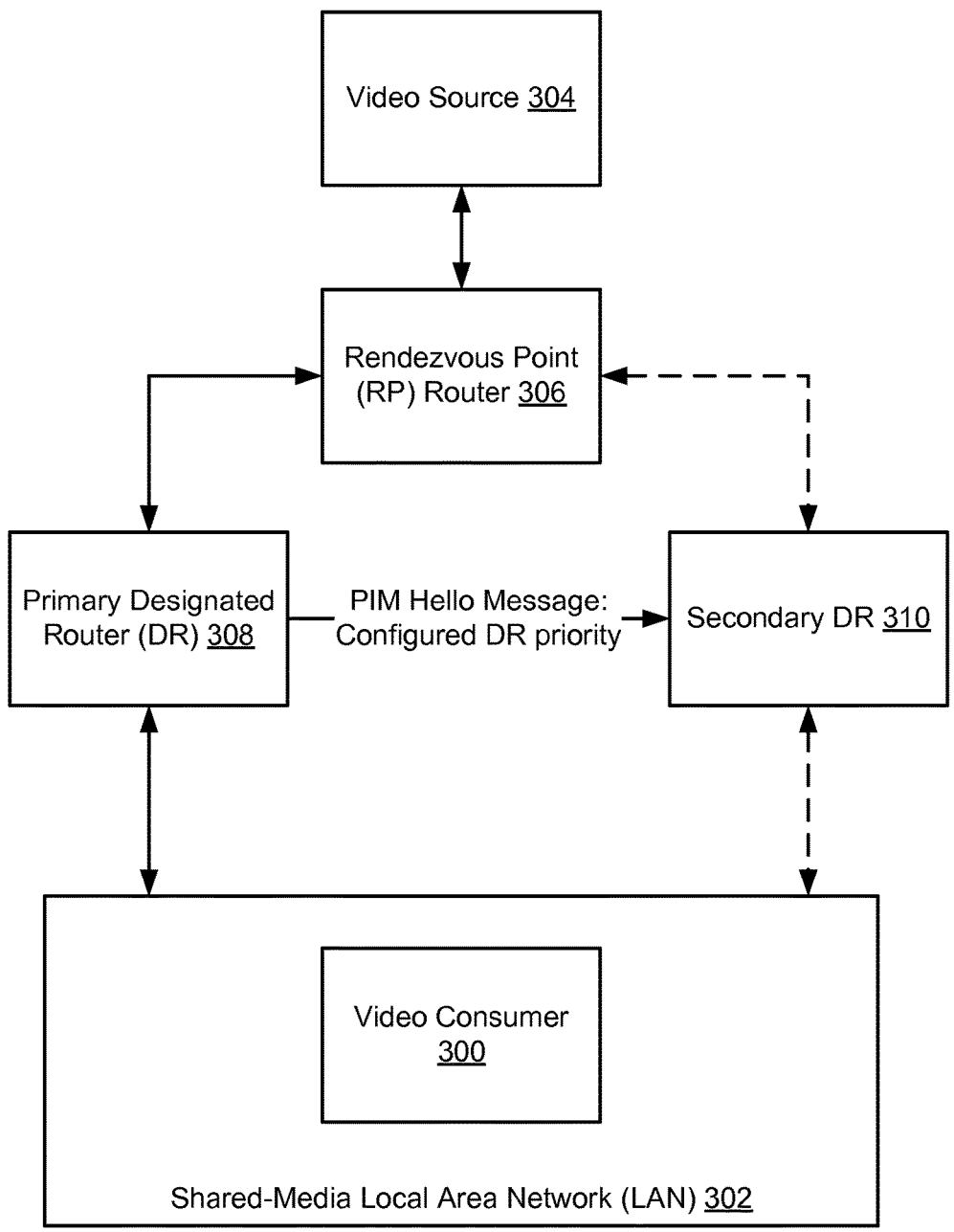

Next, as shown in FIG. 3E, after a time period based on the value of the DR parameter configured on the primary DR (308), the primary DR sends the secondary DR (310) a third PIM hello message. The third PIM hello message includes the configured DR priority of the primary DR, which is higher than the DR priority of the secondary DR. Accordingly, the secondary DR ceases performing DR functionality.

FIG. 4A, FIG. 4B, FIG. 4C, FIG. 4D, and FIG. 4E show an example in accordance with one or more embodiments of the invention. The following example is for explanatory purposes only and not intended to limit the scope of the invention.

Referring to FIG. 4A, consider again a scenario in which a video consumer (400) computing device is operatively connected to a shared-media LAN (402). The video consumer is a member of a multicast group (not shown). Also connected to the shared-media LAN are two routers, a primary DR (408) and a secondary DR (410), each of which are also operatively connected to a RP router (406). The RP router is operatively connected to a video source (404) computing device that is configured to send multicast video data to the multicast group of which the video consumer is a member.

In such a scenario, the primary DR (408) is configured with a DR priority of 7, while the secondary DR (410) is configured with a DR priority of 6. The default DR priority is one. The dashed line between the shared-media LAN (402) and the secondary DR (410), and the dashed line between the secondary DR (410) and the RP router (406), indicate that although the devices are operatively connected, the path between the RP router and the shared-media LAN that goes through the secondary DR is not a path through which multicast traffic is propagated towards the video consumer (400).

Figure 4A:
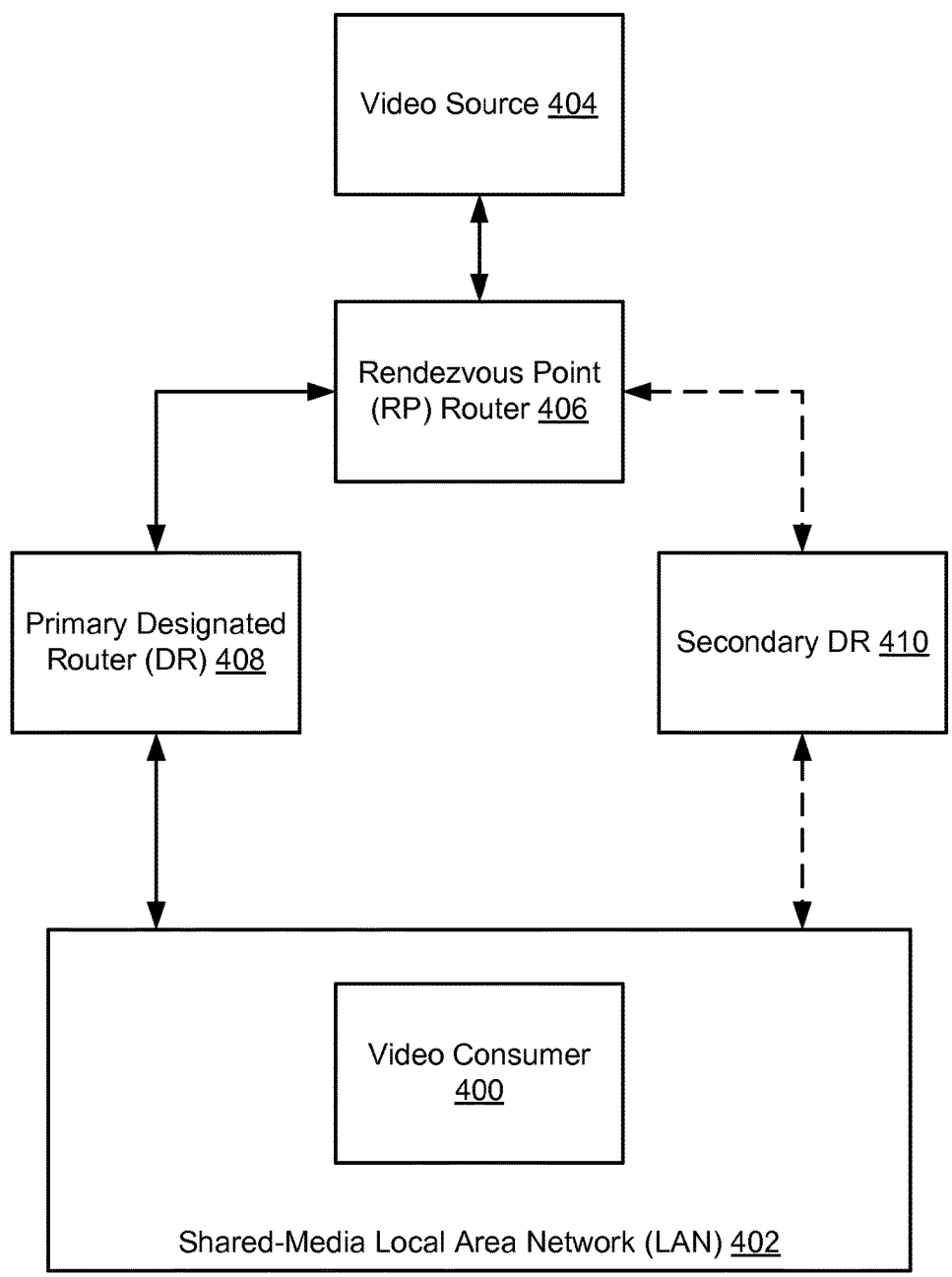
FIG. 4A, FIG. 4B, FIG. 4C, FIG. 4D and FIG. 4E show an example in accordance with one or more embodiments of the invention.

Initially, as shown in FIG. 4A, when the video source (404) sends multicast video data to a multicast group (not shown) of which the video consumer (400) is a member, the video data will be transmitted first to the RP router (406). Next, the RP router will transmit the data downstream via the shared tree of which the RP router is the root. At each branching point (not shown) of the shared tree, a PIM enabled router will duplicate the video data so that a copy can be sent towards multiple multicast group members. Eventually, the video data reaches a point where the video data could be transmitted towards the video consumer via either the primary DR (408) or the secondary DR (410). Because the primary DR has a higher configured DR priority than the secondary DR, it is the primary DR that will propagate the video data towards the video consumer.

Figure 4B:
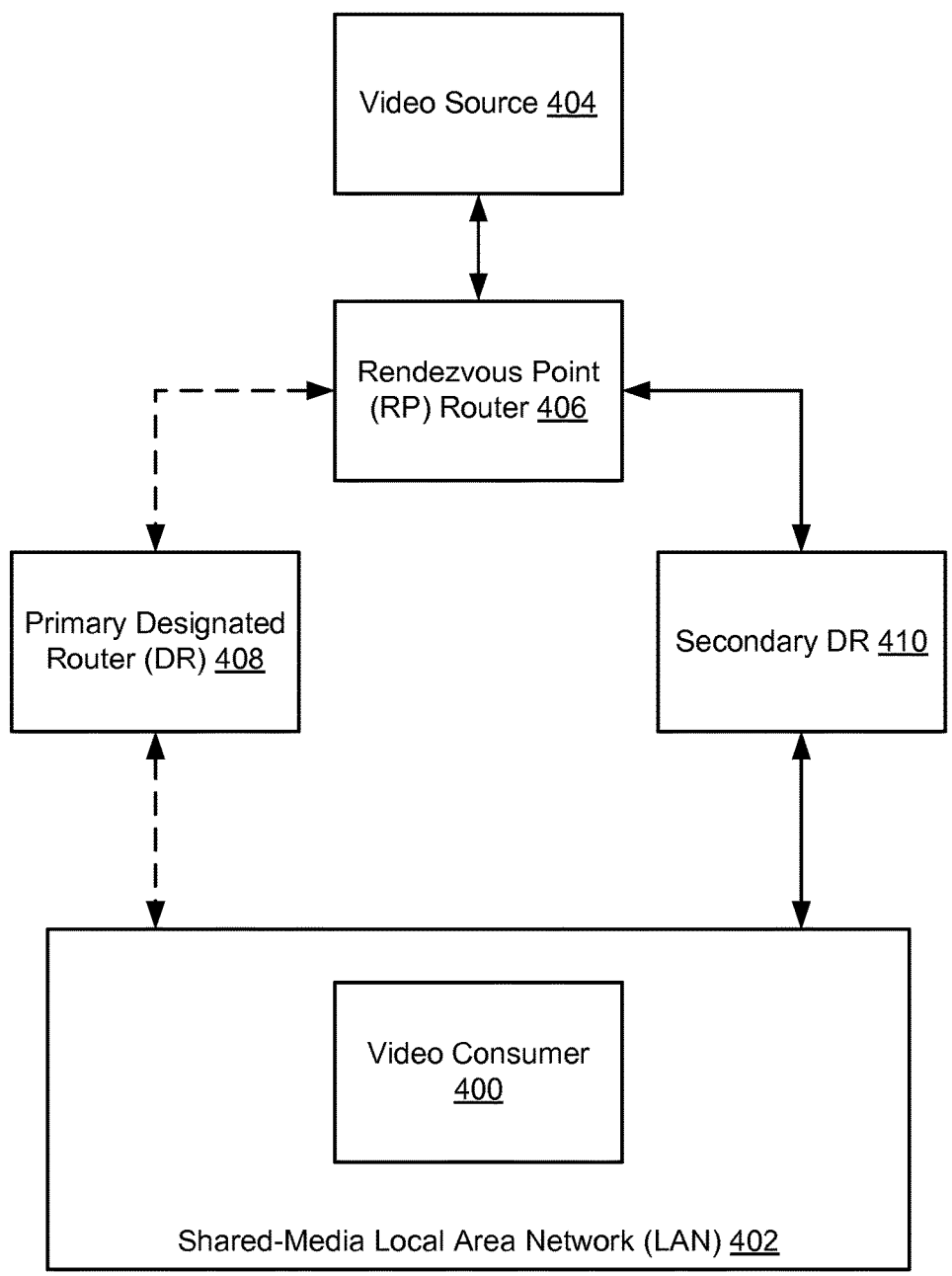

Next, as shown in FIG. 4B, the primary DR (408) ceases performing DR functionality because the primary DR has been reloaded. The reload causes the secondary DR (410) to begin acting as the DR operatively connected to the shared-media LAN because the primary DR, during the reload, fails to send a PIM hello message to the secondary DR within a timeout period.

Figure 4C:
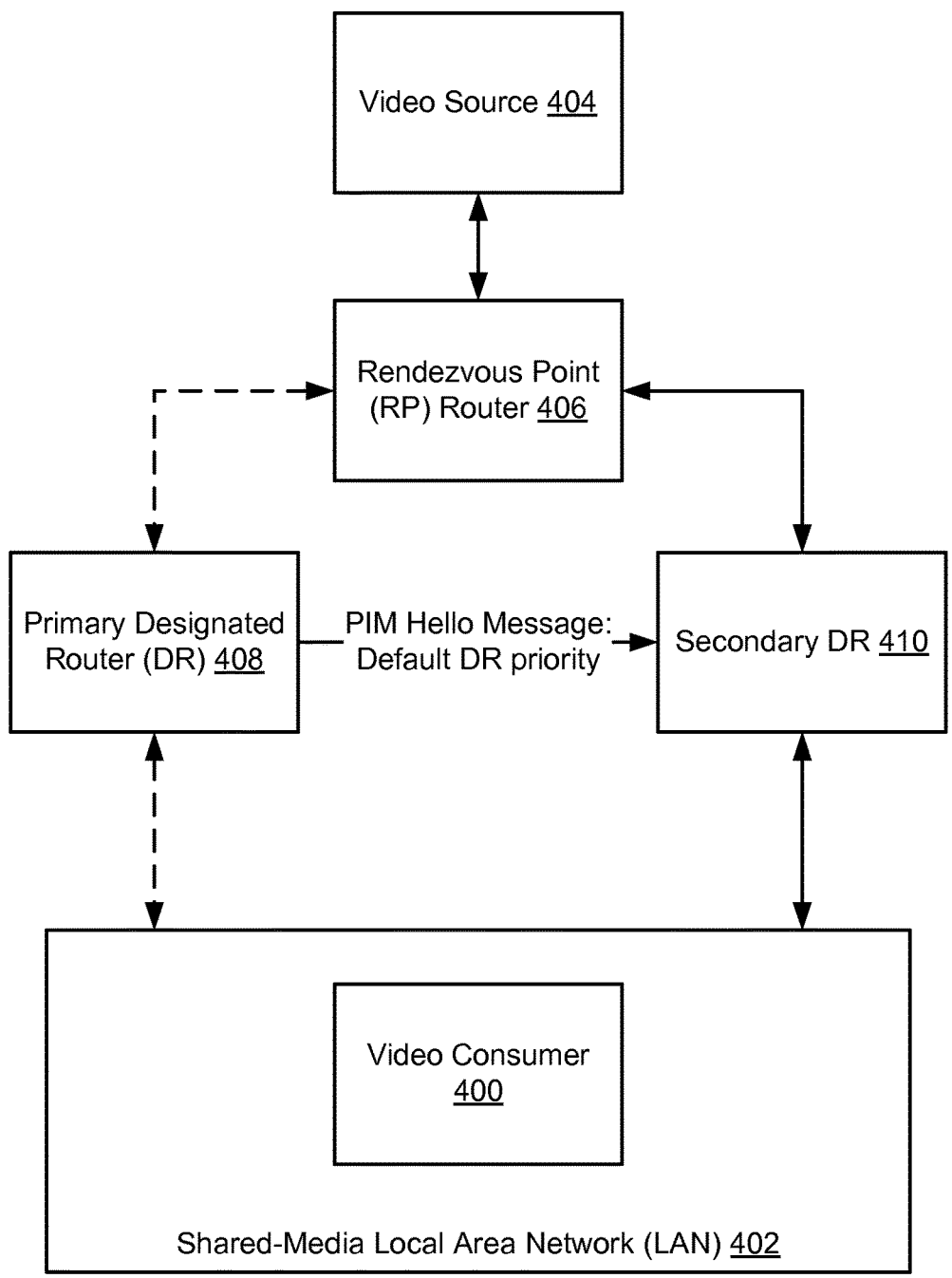

Next, as shown in FIG. 4C, the primary DR (408) begins to come back up after the reload. At this point, the primary DR is not yet performing DR functionality. Once a PIM enabled interface of the primary DR comes up, the primary DR sends a first PIM hello message to the secondary DR (410) that includes a default DR priority (which is lower than the DR priority of the secondary DR) rather than the configured DR of the primary DR (which is higher than the DR priority of the secondary DR). Upon receipt of the first PIM hello message, the secondary DR checks the DR priority in the first PIM hello message and determines that the DR priority (i.e., the default DR priority) is lower than the configured DR priority of the secondary DR. Accordingly, the secondary DR takes no action and continues performing DR functionality.

Figure 4D:
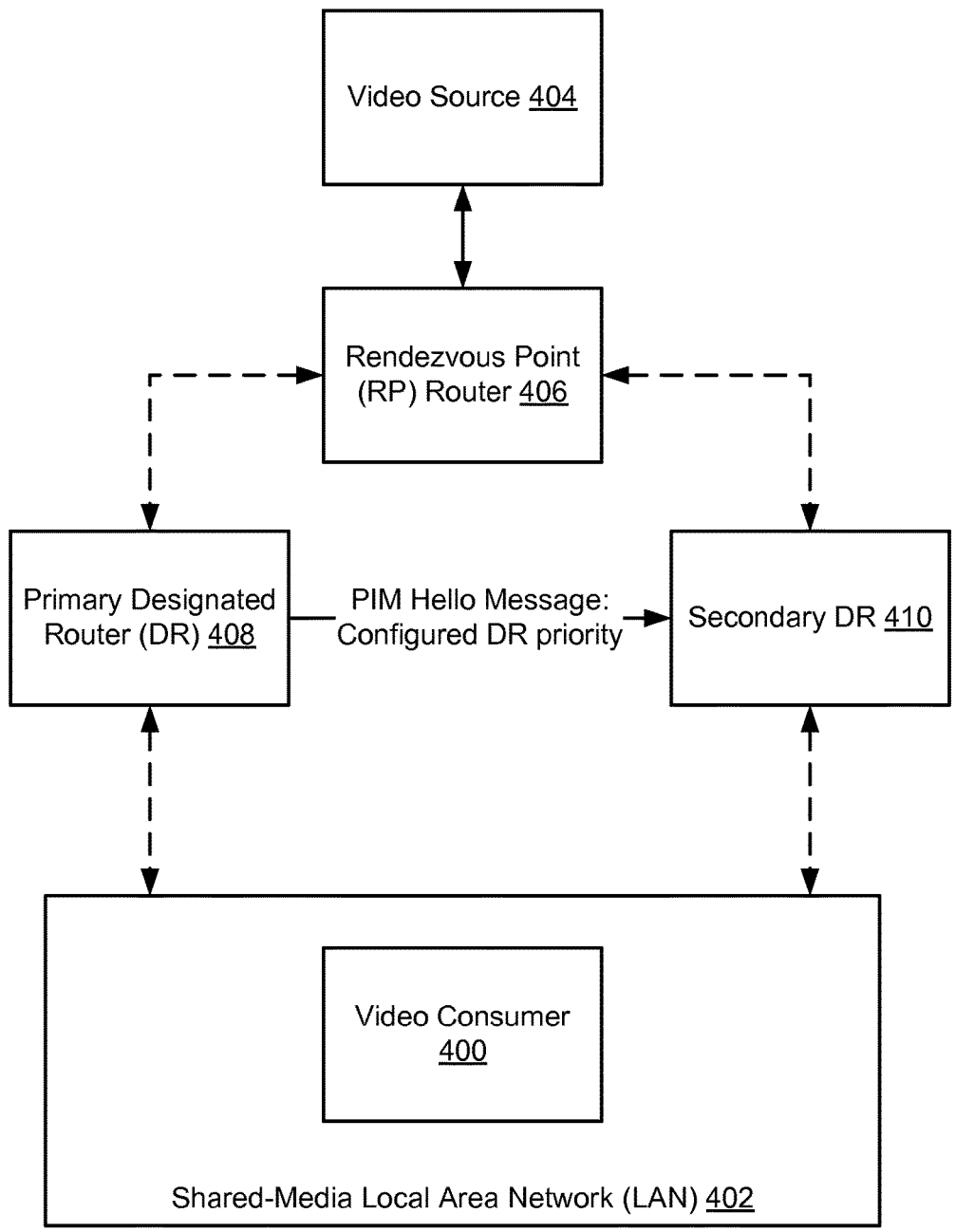

Next, as shown in FIG. 4D, the primary DR (408) reaches a system up state and sends a second PIM hello message to the secondary DR (410). However, this time the PIM hello message sent at the system up state includes the configured DR priority of the primary DR, which is higher than the DR priority of the secondary DR. Accordingly, the secondary DR ceases performing DR functionality. At this point, neither the primary DR nor the secondary DR are performing DR functionality, which may lead to video data from the video source being dropped on its way towards the video consumer. However, there will be a reduced chance that duplicate traffic is propagated towards the video consumer.

Figure 4E:
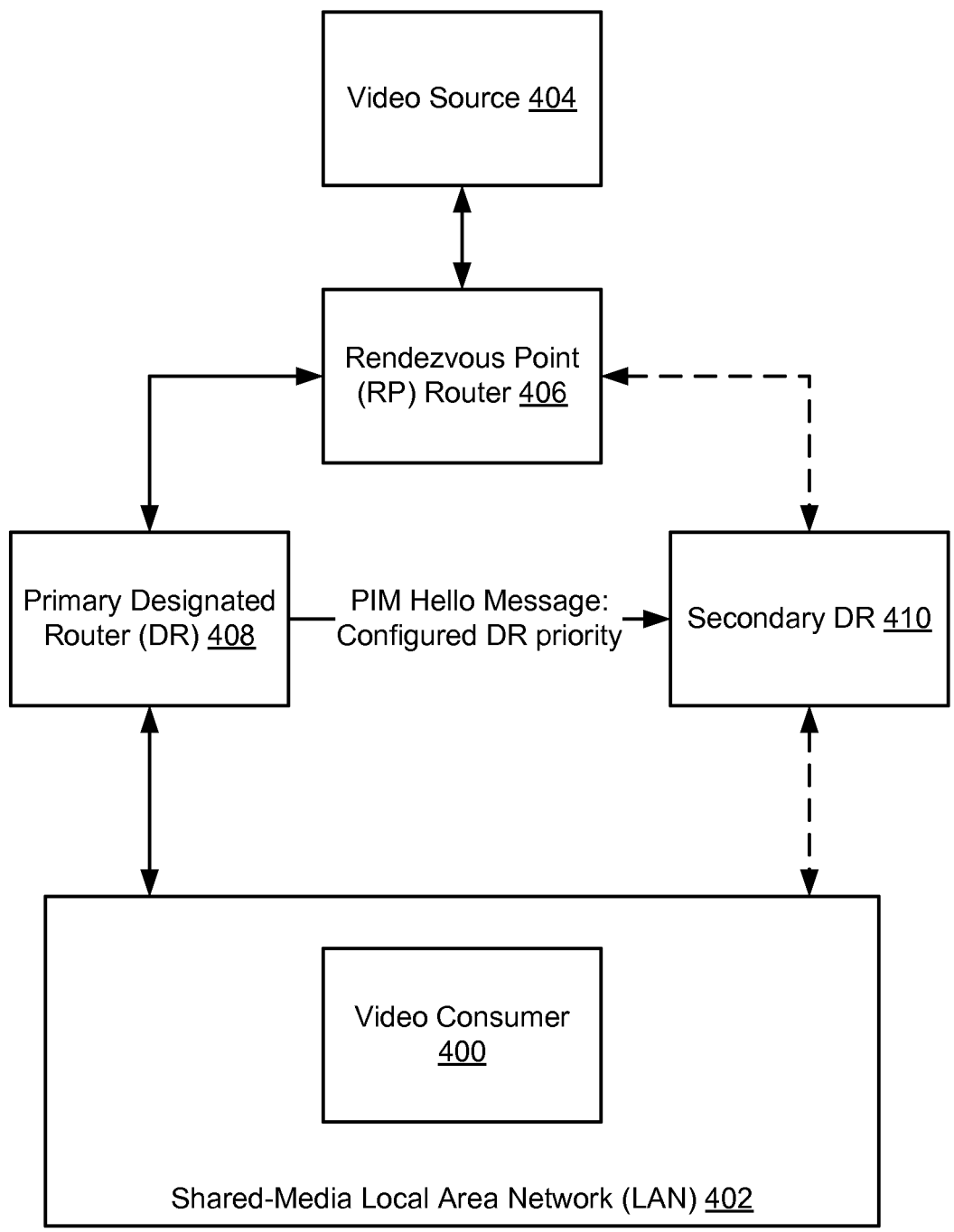

Next, as shown in FIG. 4E, after a time period based on the value of the DR parameter configured on the primary DR (408), the primary DR resumes performing DR functionality, and also sends the secondary DR (410) a third PIM hello message. The third PIM hello message includes the configured DR priority of the primary DR, which is higher than the DR priority of the secondary DR. Accordingly, the secondary DR continues to not perform DR functionality.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reducing multicast traffic loss comprising:
configuring, on a primary designated router (DR), a DR parameter comprising a value, wherein the primary DR comprises a first configured DR priority;
sending to a secondary DR that is performing DR functionality, after a Protocol Independent Multicast (PIM) interface of the primary DR comes up, a first PIM hello message comprising a default DR priority that is lower than a second configured priority of the secondary DR;
sending to the secondary DR, after the primary DR reaches a system up state, a second PIM hello message comprising the default DR priority;
performing DR functionality, by the primary DR, after the primary DR reaches the system up state; and
sending to the secondary DR, after waiting a time period corresponding to the value of the DR parameter, a third PIM hello message comprising the first configured DR priority.

2. The method of claim 1, wherein the first configured DR priority is higher than the second configured priority of the secondary DR, and wherein receipt of the third PIM hello message causes the secondary DR to cease performing DR functionality.

3. The method of claim 1, wherein during the time period, both the primary DR and the secondary DR perform DR functionality.

4. The method of claim 1, wherein the DR parameter further comprises an attribute and wherein waiting the time period before sending the third PIM hello message is based on the attribute.

5. The method of claim 4, wherein the attribute is one selected from a group consisting of a negative sign and a positive sign and is associated with the value.

6. The method of claim 1, wherein, before sending the first PIM hello message, the primary DR reloads.

7. The method of claim 6, wherein the reload of the primary DR causes a PIM hello timeout to occur on the secondary DR, and wherein the PIM hello timeout causes the secondary DR to perform DR functionality.

8. The method of claim 1, wherein DR functionality comprises transmitting multicast network traffic towards a multicast receiver device.

9. A method for reducing duplicate multicast traffic comprising:
configuring, on a primary designated router (DR), a DR parameter comprising a value and an attribute, wherein the primary DR comprises a first configured DR priority;

sending to a secondary DR that is performing DR functionality, after a protocol independent multicast (PIM) interface of the primary DR comes up, a first PIM hello message comprising a default DR priority that is lower than a second configured priority of the secondary DR;

sending to the secondary DR, after the primary DR reaches a system up state, a second PIM hello message comprising the first configured DR priority, wherein receipt of the second PIM hello message causes the secondary DR to cease performing DR functionality, and wherein the primary DR sends the second PIM hello message with the first configured DR priority to the secondary DR after reaching the system up state based on the attribute of the DR parameter; and performing DR functionality, by the primary DR, after a time period based on reaching the system up state and the value of the DR parameter.

10. The method of claim 9, wherein during the time period, the primary DR and the secondary DR do not perform DR functionality.

11. The method of claim 9, wherein the value comprises the attribute and wherein the attribute is one selected from a group consisting of a negative sign and a positive sign.

12. The method of claim 9, wherein, before sending the first PIM hello message, the primary DR reloads.

13. The method of claim 12, wherein the reload of the primary DR causes a PIM hello timeout to occur on the secondary DR, and wherein the PIM hello timeout causes the secondary DR to perform DR functionality.

14. The method of claim 9, wherein DR functionality comprises transmitting multicast network traffic towards a multicast receiver device.

15. A network device comprising:
a processor;
a Protocol Independent Multicast (PIM) interface;
a first configured designated router (DR) priority that is higher than both a default DR priority and a second configured DR priority of a secondary DR; and
a DR parameter comprising a value,
wherein that network device is configured as a primary DR,
wherein the network device is operatively connected to a rendezvous point (RP) router, a shared-media local area network (LAN), and the secondary DR, and
wherein the network device includes functionality to:
send to the secondary DR that is performing DR functionality, after the PIM interface of the primary DR comes up, a first PIM hello message comprising the default DR priority, which is lower than the second configured priority of the secondary DR;
send to the secondary DR, after the primary DR reaches a system up state, a second PIM hello message comprising the default DR priority;
perform DR functionality, by the primary DR, after the primary DR reaches the system up state; and
send to the secondary DR, after waiting a time period based on the value of the DR parameter, a third PIM hello message comprising the first configured DR priority.

16. The network device of claim 15, wherein the network device is a multi-layer switch.

17. The network device of claim 16, wherein the network device is configured as a part of a Multichassis Link Aggregation Group.

18. The network device of claim 15, wherein:
the DR parameter further comprises an attribute,
the attribute is one selected from a group consisting of a negative sign and a positive sign,
the attribute is associated with the value, and
waiting the time period before sending the third PIM hello message is based on the attribute.

19. A network device comprising:
a processor;
a Protocol Independent Multicast (PIM) interface;
a first configured designated router (DR) priority that is higher than both a default DR priority and a second configured DR priority of a secondary DR; and
a DR parameter comprising a value and an attribute,
wherein that network device is configured as a primary DR,
wherein the network device is operatively connected to a rendezvous point (RP) router, a shared-media local area network (LAN), and the secondary DR, and
wherein the network device includes functionality to:
send to the secondary DR that is performing DR functionality, after the PIM interface of the primary DR comes up, a first PIM hello message comprising a default DR priority that is lower than a second configured priority of the secondary DR;
send to the secondary DR, after the primary DR reaches a system up state, a second PIM hello message comprising the first configured DR priority, wherein receipt of the second PIM hello message causes the secondary DR to cease performing DR functionality, and wherein the primary DR sends the second PIM hello message with the first configured DR priority to the secondary DR after reaching the system up state based on the attribute of the DR parameter; and
perform DR functionality, by the primary DR, after a time period based on reaching the system up state and the value of the DR parameter.

20. The network device of claim 19, wherein the network device is a multi-layer switch.

21. The network device of claim 20, wherein the network device is configured as a part of a Multichassis Link Aggregation Group.

* * * * *